United States Patent
Shiki et al.

[11] 3,922,927
[45] Dec. 2, 1975

[54] TENSIONER FOR A BELT TRANSMISSION

[75] Inventors: Kazuhiro Shiki; Masaru Hibino, both of Toyota, Japan

[73] Assignee: Toyota Jidosha Kogyo Kabushiki Kaisha, Toyota, Japan

[22] Filed: Aug. 16, 1974

[21] Appl. No.: 498,096

[30] Foreign Application Priority Data
Jan. 17, 1974 Japan............................ 49-8393[U]

[52] U.S. Cl.................... 74/242.13 R; 74/242.15 R
[51] Int. Cl.²........................................... F16H 7/10
[58] Field of Search.. 74/242.13 R, 242.8, 242.15 R

[56] References Cited
UNITED STATES PATENTS

| | | |
|---|---|---|
| 2,876,645 | 3/1959 | Schuh ..................... 74/242.13 R X |
| 3,018,667 | 1/1962 | Spietz ..................... 74/242.15 R X |
| 3,175,574 | 3/1965 | Morford ................... 74/242.15 R X |
| 3,187,674 | 6/1965 | Hammelmann .......... 74/242.13 R X |
| 3,306,121 | 2/1967 | Jenkins ...................... 74/242.15 R |
| 3,430,507 | 3/1969 | Hurst et al. ................ 74/242.15 R |

*Primary Examiner*—Leonard H. Gerin
*Attorney, Agent, or Firm*—Spensley, Horn and Lubitz

[57] ABSTRACT

A tensioner for a belt transmission supporting an accessory which is adjunct to an automotive engine and is equipped with a driven pulley, in such a manner as to be swingable and shiftable in position. The angle of shifting in position is adjustable by means of an adjusting bolt engaged with a threaded hole part, and the belt tension on the adjusting bolt is borne by a tension-bearing wall in contact with the adjusting bolt at right angles to each other.

5 Claims, 4 Drawing Figures

TENSIONER FOR A BELT TRANSMISSION

BACKGROUND OF THE INVENTION

1. Field of the Invention

This invention relates to a belt tensioner for belt transmissions, and more specifically to a tensioner for each of such belt drives transmitting a part of automotive engine power output to an accessory, e.g., an air pump, cooler compressor, or alternator.

2. Description of the Prior Art

Usually each of the accessories, such as the air pump, for the automotive engine is swingably supported by and around a pivot pin or the like disposed offset from the rotational center of a driven pulley on the accessory. Tensioning of an endless V belt trained around the driven pulley and a drive or crank pulley on the engine is accomplished by the step of hammering and displacing the accessory a suitable distance about the pin in the direction of the V belt being stretched taut.

However, this conventional tensioning method has had disadvantages. The casings of the accessories, which are made of relatively thin sheet metals for lightweight construction purposes, tend to be easily deformed or damaged by hammerblows, and such deformation of the casing, as the case may be, can lead to malfunction or even total failure of the accessory. Further, the conventional method makes it impracticable to provide the belt with a desired rate of tension.

Another method of controlling the belt tension consists of attaching a member having a threaded hole to the accessory, swingably and shiftably in position, by means of a shaft extended at right angles to the threaded hole, keeping an adjusting bolt in threadable engagement with the hole, with its lower end in contact with the car body, and turning the bolt to swing and shift the position of the accessory. This method is disadvantageous, too, because the fabrication and machining of such member having the threaded hole and necessary means for mounting the member pivotably involve complicate processes and much cost.

SUMMARY OF THE INVENTION

The present invention has its object to provide a belt tensioner for an accessory of an automotive engine simple in construction and yet capable of providing any desired tension to the endless belt of the belt transmission.

DETAILED DESCRIPTION OF PREFERRED EMBODIMENTS

Figure 1:
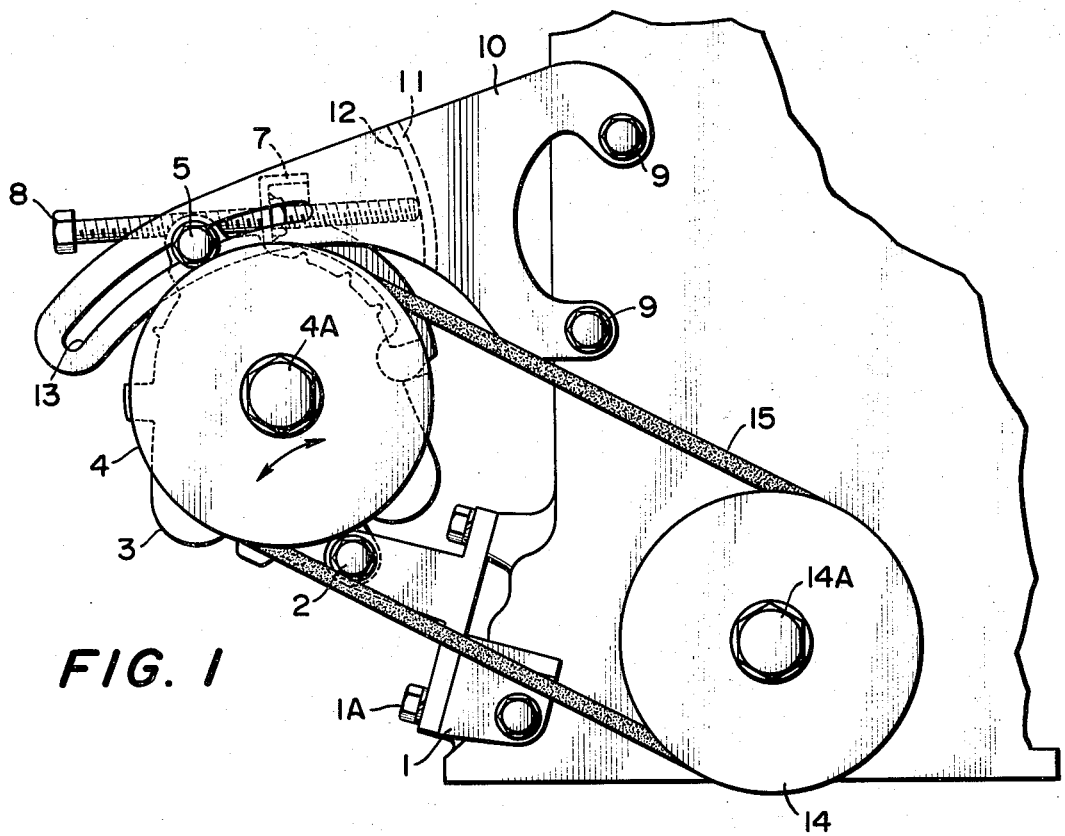
FIG. 1 is a front view of an embodiment of the present invention as applied to the tension control of an endless belt for driving an air pump.
Figure 2:
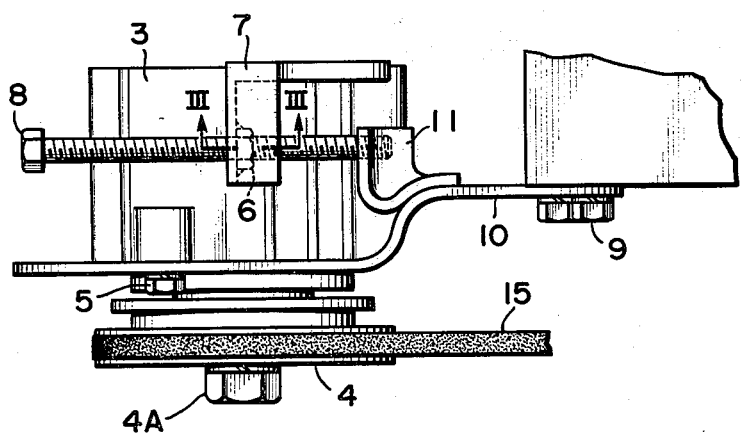
FIG. 2 is a plan view of the embodiment.
Figure 3:
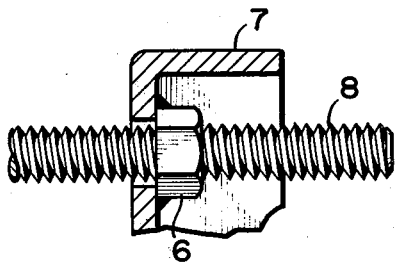
FIG. 3 is an enlarged sectional view taken along the line III—III of FIG. 2.

Referring to FIGS. 1 and 2, a bracket 1 fixed to an engine (not shown) carries, on its fulcrum 2 or pivot pin in the form of a bolt, an accessory 3 adjunct to the engine, e.g., an air pump, alternator, or cooler compressor, which is adapted for pivotal angular movement about the fulcrum 2.

The accessory 3 is provided with a driven pulley 4 having its center of rotation at a point spaced from the pivot fulcrum 2, a fastening bolt 5 with its axis parallel to the rotational center axis of the driven pulley 4, and a bolt shank bearing 7 formed with a threaded hole part 6 having its axis on a plane parallel to the plane of pivotal movement of the accessory 3.

The threaded hole part 6 usually takes the form of a nut welded to the bolt shank bearing 7 which is L-shaped in cross section and secured to the accessory 3. The threaded hole part 6 is in thread engagement with an adjusting bolt 8. The end of the bolt 8 projected beyond the hole part 6 is pressed against a tension-bearing wall 11 of an adjusting plate 10 which is made fast to the engine by bolts 9.

The tension-bearing wall 11 has a curved surface 12 such that, even if the adjusting bolt 8 is swung and shifted in position together with the accessory 3, through a certain angular movement about the fulcrum 2, the adjusting bolt 8 will remain in contact with the curved surface at substantially right angles thereto (provided that the amount of projection of the bolt 8 from the bolt shank bearing is properly adjusted). Although it is not objectionable to keep the bolt 8 abutted against the curved surface at exactly right angles thereto, the fabrication of the curved surface with sufficient dimensional accuracy to meet the requirement will involve too much difficulties in machining. For practical purposes, therefore, the contact at substantially right angles may as well be employed.

A slot 13 is formed in the adjusting plate 10 to receive the fixing bolt 5 at right angles to the plate axis. The slot 13 is arcuately shaped with respect to the pivot fulcrum 2, so that the accessory 3 can be fixed in any desired position by tightening the fastening bolt 5 on the adjusting plate 10.

Reference numeral 14 indicates a crank pulley of the engine. An endless V belt 15 is trained around both the pulley 14 and the driven pulley 4, which are mounted in position by bolts 14A, 4A, respectively. Mounting bolts for the bracket 1 are designated at 1A.

With the foregoing construction the embodiment of the invention is operated as follows. The adjusting bolt 8 is rotated forward with the fastening bolt 5 loosened, so as to turn the accessory 3, via the threaded hole part 6 and the bolt shank bearing 7, in the direction of the endless V belt 15 being stretched taut. At a point where a proper tension has been attained in the manner described, the fastening bolt 5 is imparted to the V belt. Prior to the tightening of the fastening bolt 5, the tension of the belt 15 is borne by the tension-bearing wall 11 through the adjusting bolt 8 (whereas, after the fastening of the bolt 5, a fraction of the tension is directly borne by the adjusting plate 10). However, because the adjusting bolt 8 contacts the curved surface 12 of the tension-bearing wall 11 at right angles thereto, there is no possibility of the adjusting bolt being bent or otherwise deformed by the tension of the V belt.

Figure 4:
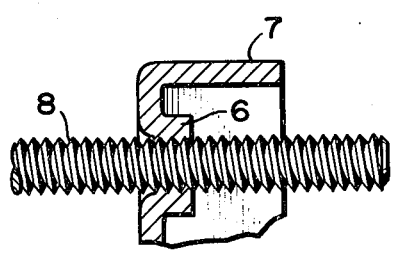
FIG. 4 is an enlarged sectional view of a modified form of the threaded hole part shown in FIG. 3.

While the threaded hole part 6 in the embodiment so far described is in the form of a nut, it may be modified as shown in FIG. 4, that is, by bending the surrounding wall of the hole inwardly and internally threading the thus elongated hole part. Also, the tension-bearing wall 11 may not necessarily be integral with the adjusting plate 10.

What is claimed is:

1. A tensioner for a belt transmission supporting an accessory which is adjunct to the engine of an automobile and equipped with a driven pulley connected via belting to a drive pulley of the engine, at a fulcrum spaced from the rotational center of the driven pulley, in such a manner that the accessory can be swung and shifted in angular position relative to the fulcrum, the tensioner comprising:

a threaded hole part secured to said accessory;
an adjusting bolt in threadable engagement with said hole part and projecting beyond the latter;
a tension-bearing wall adapted to receive the projecting end of said adjusting bolt in contact at substantially right angles thereto so as to bear the tension of the belt transmitted through said adjusting bolt;
an adjusting plate formed with a slot arcuately shaped relative to said fulcrum for swinging movement of said accessory; and
a bolt extended across the slot for threadable engagement with a threaded hole in said accessory and for fastening said accessory to said adjusting plate.

2. A tensioner according to claim 1 wherein the threaded hole part is in the form of a nut welded to the accessory.

3. A tensioner according to claim 1 wherein the threaded hole part is provided in a bolt shank bearing which is formed integrally with the accessory.

4. A tensioner according to claim 1 wherein the tension-bearing wall and the adjusting plate are integrally fabricated together.

5. A tensioner according to claim 1 wherein the tension-bearing wall has a curved surface such that when said adjusting bolt is swung and shifted together with said accessory, said adjusting bolt remains in contact with said curved surface at substantially right angles thereto.

* * * * *